United States Patent
Hays

(10) Patent No.: US 9,801,411 B1
(45) Date of Patent: Oct. 31, 2017

(54) CIGARETTE SMOKE-FILTERING DEVICE

(71) Applicant: Carl Hays, Dallas, TX (US)

(72) Inventor: Carl Hays, Dallas, TX (US)

( * ) Notice: Subject to any disclaimer, the term of this patent is extended or adjusted under 35 U.S.C. 154(b) by 0 days.

(21) Appl. No.: 14/606,359

(22) Filed: Jan. 27, 2015

(51) Int. Cl.
| | |
|---|---|
| *A24F 13/00* | (2006.01) |
| *A24F 13/06* | (2006.01) |
| *A24D 3/16* | (2006.01) |
| *A24D 3/04* | (2006.01) |
| *B01D 39/20* | (2006.01) |
| *B01D 46/00* | (2006.01) |

(52) U.S. Cl.
CPC ............. *A24F 13/06* (2013.01); *A24D 3/04* (2013.01); *A24D 3/163* (2013.01); *B01D 39/2055* (2013.01); *B01D 46/0012* (2013.01); *B01D 2267/00* (2013.01)

(58) Field of Classification Search
CPC . A24D 3/10; A24F 13/00; A24F 13/02; A24F 13/04; A24F 13/06; A24F 13/08; A24F 19/0042; A31F 3/30
See application file for complete search history.

(56) References Cited

U.S. PATENT DOCUMENTS

| | | | | |
|---|---|---|---|---|
| 2,910,986 | A | * | 11/1959 | Law ................. A24F 13/00 131/175 |
| 4,682,610 | A | * | 7/1987 | Freelain .............. A24F 1/30 131/173 |
| 4,807,646 | A | | 2/1989 | Sahar |
| 4,993,435 | A | | 2/1991 | McCann |
| D315,617 | S | | 3/1991 | Boutte |
| 5,048,545 | A | | 9/1991 | Takagi |
| 5,469,870 | A | | 11/1995 | Meador |
| RE36,106 | E | | 2/1999 | Bruno |
| 2005/0188663 | A1 | | 9/2005 | Cuevas Peguero et al. |
| 2010/0326453 | A1 | * | 12/2010 | Chaoui ............ A24F 1/30 131/173 |
| 2014/0305447 | A1 | * | 10/2014 | Saco ................ A24F 1/30 131/225 |

FOREIGN PATENT DOCUMENTS

| | | | |
|---|---|---|---|
| FR | 706017 | * | 10/1930 |
| FR | 1290569 | * | 3/1962 |
| GB | 712448 | * | 7/1944 |

OTHER PUBLICATIONS

US 8,381,740, 02/2013, Bollinger (withdrawn)

* cited by examiner

*Primary Examiner* — Jacob T Minskey
*Assistant Examiner* — Manley L Cummins, IV

(57) ABSTRACT

The cigarette smoke-filtering device includes a bottom dome that includes at least one inlet port thereon. The at least one inlet port of the bottom dome is adapted to receive a lit cigarette thereon. The bottom dome is attachable to a top dome. The bottom dome and the top dome form an interior cavity that supports a carbon filter and a smoke chamber. The carbon filter is responsible for filtering cigarette smoke delivered from the lit cigarette via the at least one inlet port. The bottom dome includes an outlet that is affixed to a hose that extends there from. The hose is in turn attached to a mouthpiece.

1 Claim, 4 Drawing Sheets

CIGARETTE SMOKE-FILTERING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cigarettes, more specifically, a cigarette accessory that is configured to filter cigarette smoke.

SUMMARY OF INVENTION

The cigarette smoke-filtering device includes a bottom dome that includes at least one inlet port thereon. The at least one inlet port of the bottom dome is adapted to receive a lit cigarette thereon. The bottom dome is attachable to a top dome. The bottom dome and the top dome form an interior cavity that supports a carbon filter and a smoke chamber. The carbon filter is responsible for filtering cigarette smoke delivered from the lit cigarette via the at least one inlet port. The interior cavity includes an exhaust port that is built into a topmost portion of the top dome. The bottom dome includes an outlet that is affixed to a hose that extends there from. The hose is in turn attached to a mouthpiece. The mouthpiece may include a second filter member in order to further filter cigarette smoke. The hose and mouthpiece are in fluid communication with the smoke chamber. Cigarette smoke enters into the interior cavity via the at least one inlet port, said cigarette smoke passes across the carbon filter before entering into the smoke chamber where a vacuum is formed that draws said cigarette smoke into the hose and mouthpiece.

These together with additional objects, features and advantages of the cigarette smoke-filtering device will be readily apparent to those of ordinary skill in the art upon reading the following detailed description of the presently preferred, but nonetheless illustrative, embodiments when taken in conjunction with the accompanying drawings.

In this respect, before explaining the current embodiments of the cigarette smoke-filtering device in detail, it is to be understood that the cigarette smoke-filtering device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cigarette smoke-filtering device.

It is therefore important that the claims be regarded as including such equivalent construction insofar as they do not depart from the spirit and scope of the cigarette smoke-filtering device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
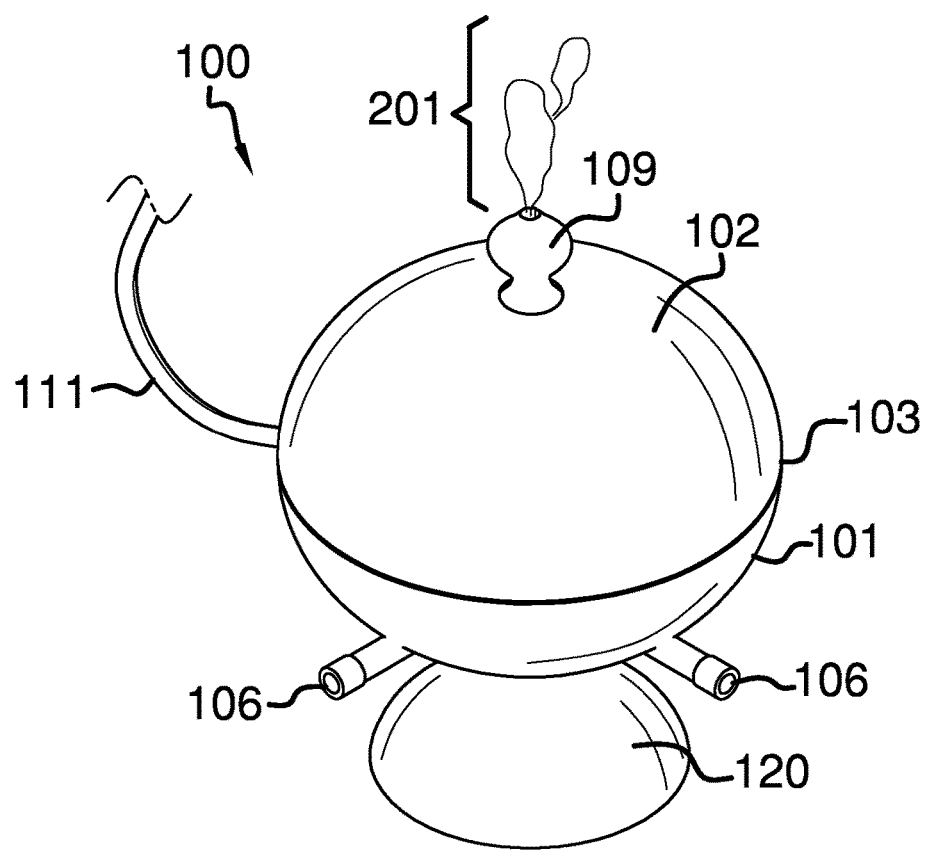
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The cigarette smoke-filtering device 100 (hereinafter invention) includes a bottom dome 101 and a top dome 102. The bottom dome 101 being hemi-spherical in shape includes a bottom edge 103 that is selectively securable to a top edge 104 of the top dome 102. The top dome 102 is hemi-spherical in shape, and when secured with the bottom dome 101 shall form an interior cavity 105. The interior cavity 105 is spherical in shape.

The bottom dome 101 includes at least one inlet port 106 thereon. The at least one inlet port 106 is adapted to receive and support a lit cigarette 200 thereon. The at least one inlet port 106 is in fluid communication with the interior cavity 105 of the invention 100. The interior cavity 105 supports a carbon filter 107 therein. The carbon filter 107 is in fluid communication with the at least one inlet port 106 such that cigarette smoke 201 passes across the carbon filter 107 before entering a smoke chamber 108. The smoke chamber 108 shall be the space remaining of the interior cavity 105 less the carbon filter 107.

The top dome 102 includes an exhaust port 109 that is positioned at a topmost portion of the top dome 102. The exhaust port 109 enables excess cigarette smoke 201 to exhaust from the top dome 102. The bottom dome 101 includes an outlet 110 that is affixed to a hose 111 that extends there from. The hose 111 is in turn attached to a mouthpiece 112. The mouthpiece 112 may include a second filter member 113 in order to further filter the cigarette smoke 201. The hose 111 and the mouthpiece 112 are in fluid communication with the smoke chamber 108. The cigarette smoke 201 enters into the interior cavity 105 via the at least one inlet port 106. The cigarette smoke 201 passes across the carbon filter 107 before entering into the smoke chamber 108 where a vacuum is formed that draws said cigarette smoke 201 into the hose 111 and the mouthpiece 112.

The mouthpiece 112 may be further defined with a carb 116 that is used in concert with the mouthpiece 112. Carbs are well known in the art unit pertaining to smoking and pipes. The hose 111 is made of a flexible material, and is of an undefined length. The at least one port 106 of the bottom dome 101 are in fluid connection with one another. Moreover, the at least one port 106 includes a dome duct 117 that extends inwardly to a central duct 118. The central duct 118 is vertically oriented, and is positioned underneath the carbon filter 107. The outlet 110 includes a dome receptacle 119 that is positioned inside of the bottom dome 101 and is in fluid communication with the interior cavity 105.

The bottom dome 101 includes a base 120 that is adapted to be grasped via a user 300. Moreover, the base 120 is adapted to support the invention 100 on a surface 400.

Figure 2:
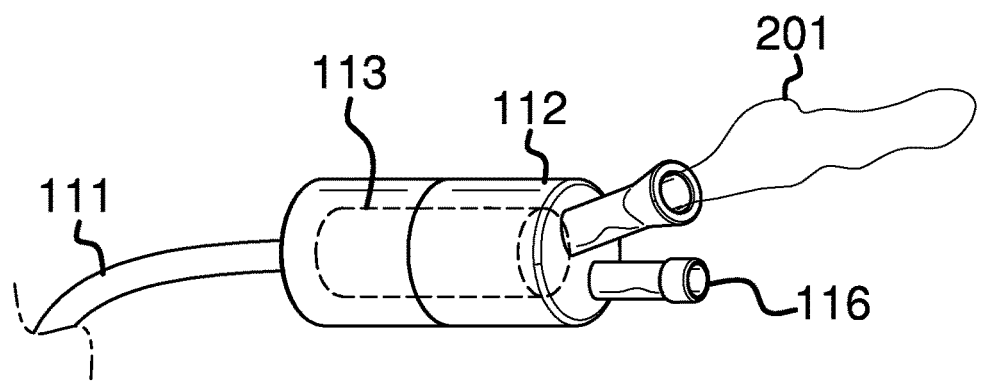
FIG. 2 is a detail view of an embodiment of the disclosure.
Figure 3:
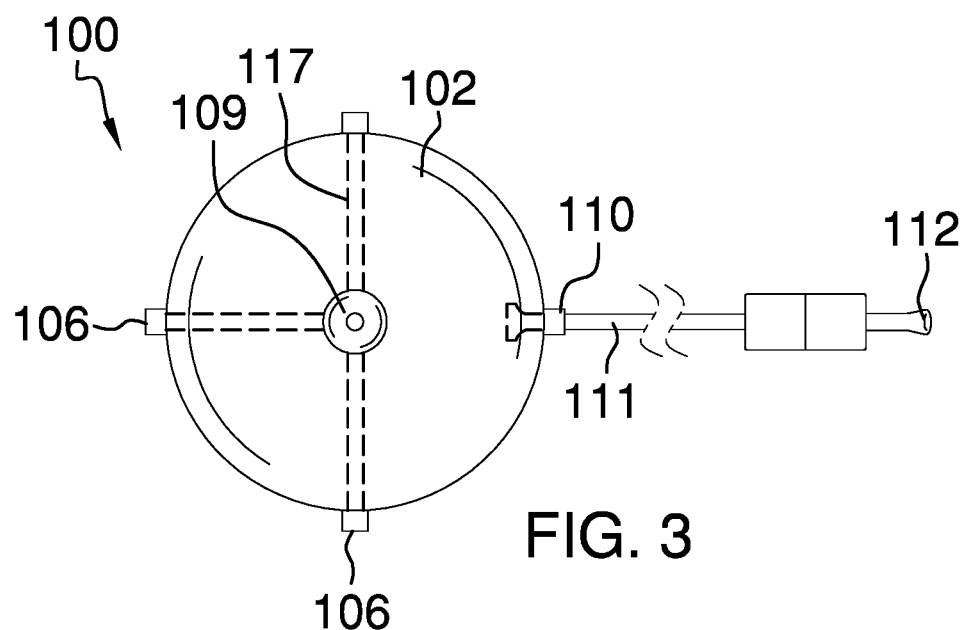
FIG. 3 is a top view of an embodiment of the disclosure.
Figure 4:
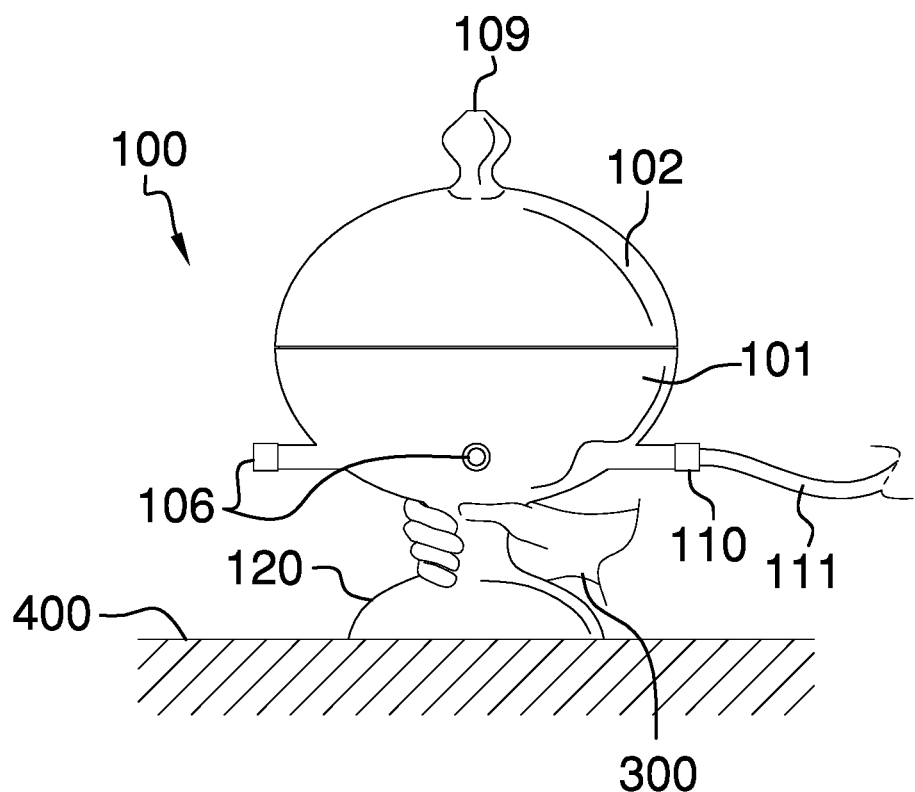
FIG. 4 is a side view of an embodiment of the disclosure.
Figure 5:
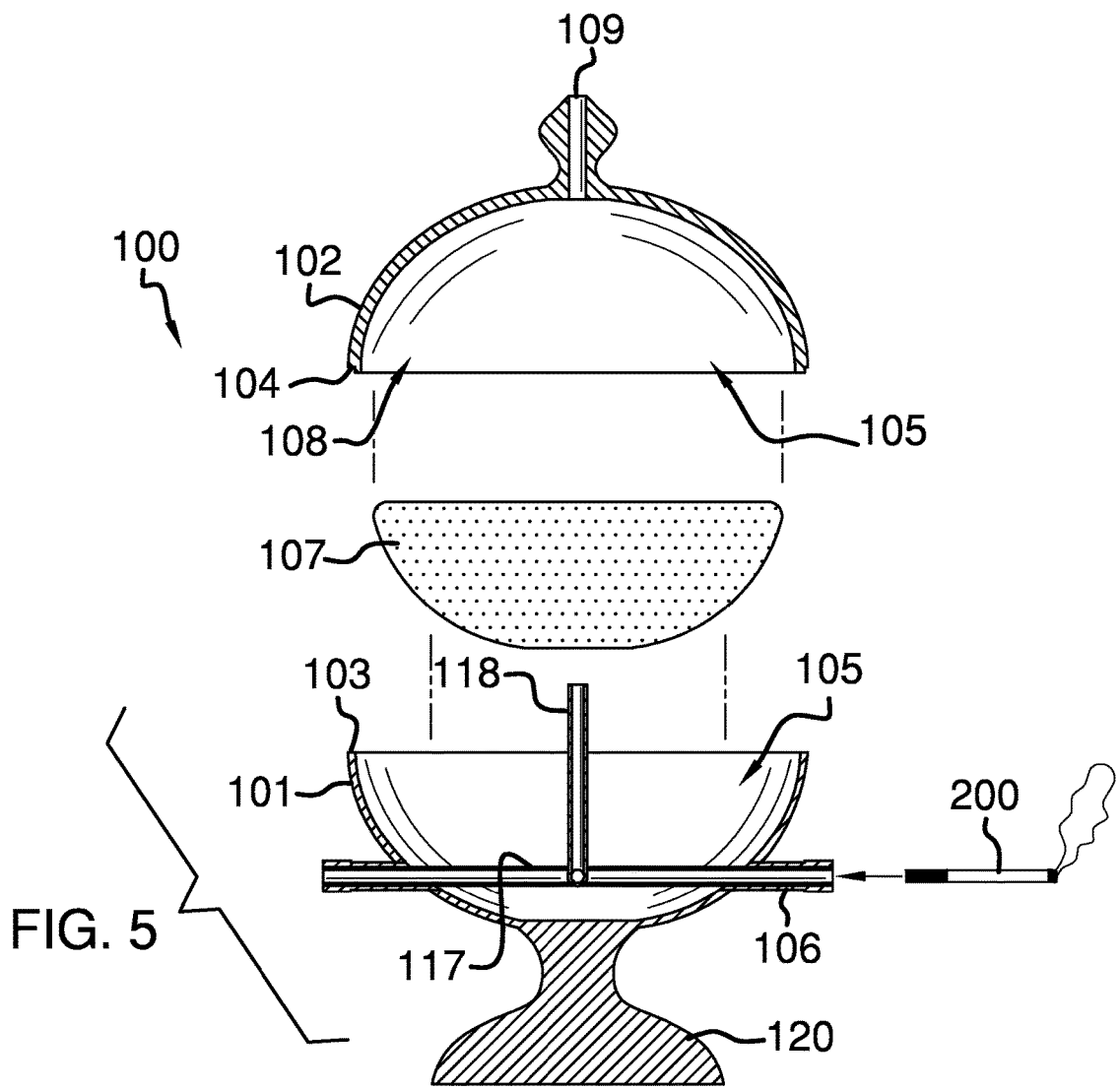
FIG. 5 is a side, exploded view of an embodiment of the disclosure.
Figure 6:
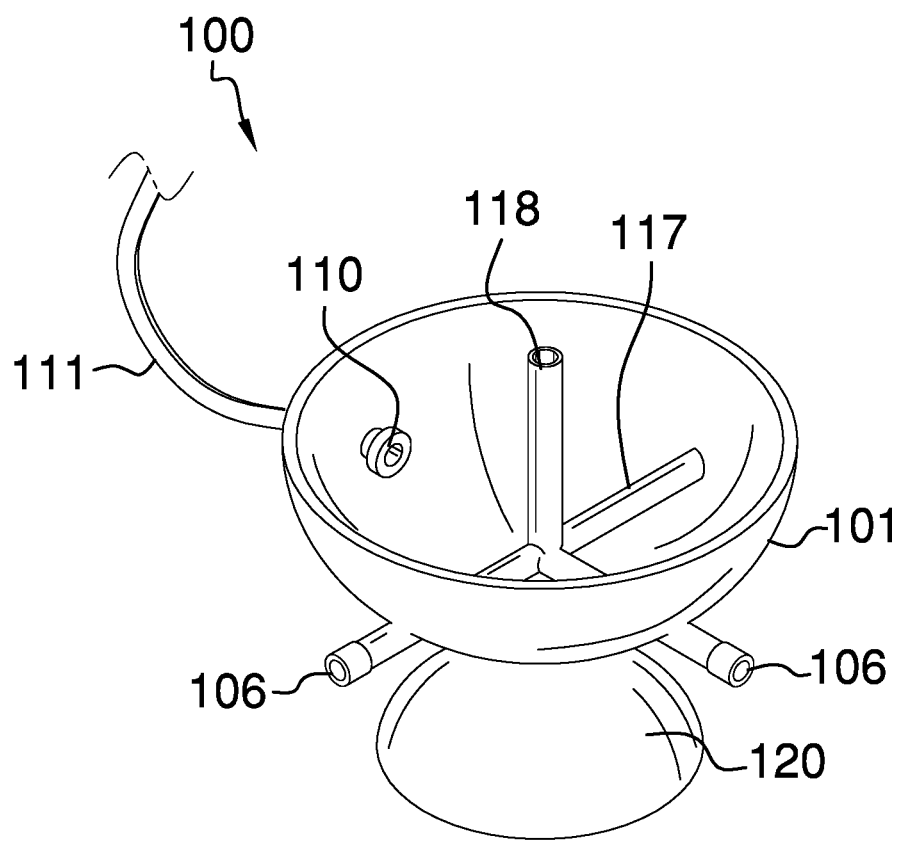
FIG. 6 is another perspective view of an embodiment of the disclosure with the top dome and the filter removed.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A cigarette smoke-filtering device wherein:
a bottom dome positioned to a top dome in order to form an interior cavity;
wherein at least one inlet port is in fluid communication with the interior cavity;
wherein said at least one inlet port is adapted to receive and support a lit cigarette;
wherein a hose and mouthpiece extend from said bottom dome;
wherein the bottom dome and the top dome are each hemi-spherical in shape;
wherein the bottom dome is further defined with a bottom edge that is selectively securable to a top edge of the top dome;
wherein the interior cavity is spherical in shape;
wherein the bottom dome includes the at least one inlet port thereon;
wherein the interior cavity supports a carbon filter therein;
wherein the carbon filter is in fluid communication with the at least one inlet port such that cigarette smoke passes across the carbon filter before entering a smoke chamber;
wherein the smoke chamber shall be the space remaining of the interior cavity less the carbon filter;
wherein the top dome includes an exhaust port that is positioned at a topmost portion of the top dome;
wherein the exhaust port enables excess cigarette smoke to exhaust from the top dome;
wherein the bottom dome includes an outlet that is affixed to said hose that extends there from;
wherein the hose is in turn attached to said mouthpiece;
wherein the mouthpiece includes a second filter member in order to further filter the cigarette smoke;
wherein the hose and the mouthpiece are in fluid communication with the smoke chamber;
wherein the cigarette smoke adaptively enters into the interior cavity via the at least one inlet port;
wherein the cigarette smoke adaptively passes across the carbon filter before entering into the smoke chamber where a vacuum is formed that draws said cigarette smoke into the hose via the mouthpiece;
wherein the mouthpiece includes a carb that is used in concert with the mouthpiece;
wherein the at least one inlet port of the bottom dome comprises a plurality of ports that are in fluid connection with one another;
wherein the plurality of ports each have a respective dome duct;
wherein each respective dome duct extends inwardly from the plurality of ports and connect with a central duct;
wherein the central duct is vertically oriented, and is positioned underneath the carbon filter;
wherein the outlet includes a dome receptacle that is positioned inside of the bottom dome and is in fluid communication with the interior cavity;
wherein the bottom dome includes a base that is adapted to be grasped via a user;
wherein the base is adapted to support the bottom dome on a surface.

* * * * *